(12) United States Patent
Dutton

(10) Patent No.: US 6,709,627 B2
(45) Date of Patent: Mar. 23, 2004

(54) METHOD OF MAKING A PRODUCT

(75) Inventor: John Dutton, Gwynedd (GB)

(73) Assignee: Digive Limited, Gwynedd (GB)

( * ) Notice: Subject to any disclaimer, the term of this patent is extended or adjusted under 35 U.S.C. 154(b) by 0 days.

(21) Appl. No.: 10/093,805

(22) Filed: Mar. 8, 2002

(65) Prior Publication Data

US 2003/0075841 A1 Apr. 24, 2003

Related U.S. Application Data

(63) Continuation of application No. 09/755,855, filed on Jan. 5, 2001, now Pat. No. 6,387,319, which is a continuation of application No. 09/319,101, filed as application No. PCT/GB97/03149 on Nov. 14, 1997, now abandoned.

(30) Foreign Application Priority Data

Nov. 30, 1996 (GB) .............................................. 9624891
Aug. 14, 1997 (GB) .............................................. 9717146

(51) Int. Cl.[7] .............................. C04B 33/32; B28B 3/20
(52) U.S. Cl. ...................... 264/642; 264/638; 264/644; 264/669; 264/679; 264/680
(58) Field of Search ................................ 264/642, 679, 264/669, 609, 638, 644, 678, 680; 501/127, 131

(56) References Cited

U.S. PATENT DOCUMENTS

| | | | | |
|---|---|---|---|---|
| 2,543,548 A | | 2/1951 | Henry et al. | 106/67 |
| 3,199,992 A | | 8/1965 | Moffitt | 106/39 |
| 3,360,595 A | | 12/1967 | Wittels | 264/63 |
| 3,651,184 A | | 3/1972 | Everhart et al. | 264/56 |
| 3,759,726 A | | 9/1973 | Wittels | 106/45 |
| 4,542,058 A | * | 9/1985 | Fukuoka | 264/44 |
| 5,244,850 A | | 9/1993 | Dutton | 501/128 |
| 6,213,415 B1 | * | 4/2001 | Cheung | 241/22 |
| 6,387,319 B1 | * | 5/2002 | Dutton | 264/669 |

FOREIGN PATENT DOCUMENTS

| | | |
|---|---|---|
| DE | 11 97 009 B | 7/1960 |
| EP | 0 421 391 A | 4/1991 |
| EP | 0 433 684 A | 6/1991 |
| GB | 976709 | 7/1960 |
| WO | WO 91 08989 A | 6/1991 |
| WO | WO 96 02477 A | 1/1996 |

OTHER PUBLICATIONS

Abstract of JP05254917, Oct. 1993*
Derwent Abstract of JP05254917, Jun. 2001.*
Machine Translation of JP05254917, Oct. 1993.*
Derwent Abstract of BR 9105386, Jun. 1993.*
Section Ch, Week 9727 Derwent Publications Ltd., London, GB; AN 97–294668 XP002056359 & JP 09 110 470 A (Nippon Electric Glass Co), Apr. 28, 1997 (see Abstract).
Section Ch, Week 9723 Derwent Publications Ltd., London, GB; AN 97–255256 XP002056360 & JP 09 086 962 A (Nippon Electric Glass Co), Mar. 31, 1997 (see Abstract).

* cited by examiner

Primary Examiner—Christopher A. Fiorilla
(74) Attorney, Agent, or Firm—Marshall, Gerstein & Borun LLP

(57) ABSTRACT

A method of making a product which is generally impervious to water including the steps of making a generally homogenous mixture of slate particles and clay, wetting the mixture as necessary to produce a formable composition, forming the wet mixture to a desired configuration, at least partially drying the formed mixture and subjecting the dried formed mixture to a temperature of at least 1100° C. for a time sufficient for at least some of the clay to convert into a binder to bind together the slate particles.

40 Claims, No Drawings

METHOD OF MAKING A PRODUCT

CROSS-REFERENCE TO RELATED APPLICATION

This application is a continuation of application Ser. No. 09/755,855, filed Jan. 5, 2001 now U.S. Pat. No. 6,387,319 which is a continuation of application Ser. No. 09/319,101 filed May 28, 1999 now abandoned, which is the U.S. national stage filing under 35 U.S.C. §371 of PCT/GB97/03149 filed Nov. 14, 1997, based on GB 9717146.6 filed Aug. 14, 1997 and based on GB 9624891.9 filed Nov. 30, 1996.

This invention relates to a method of making a product and more particularly but not exclusively to a method of making a building product such as a tile.

In our previous patent GB 2244051 there is disclosed a method of making a building product from slate particles which in the end product are bonded together by a fused glassy binder. In the examples described, the binder comprises recycled glass or sodium silicate for examples. When such products are fired, the recycled glass melts or the silicate of the sodium silicate fuses with the result in each case that the slate particles are held in a matrix of fused glassy binder.

It was found that in such a method, the use of sodium silicate as a binder rather than recycled glass was preferred as the end (building) product was of a more consistent quality. However sodium silicate is all expensive raw material.

According to the first aspect of the present invention we provide a method of making a product comprising the steps of making a generally homogenous mixture of slate particles and clay powder, wetting the mixture as necessary to produce a formable composition, forming the wet mixture to a desired configuration, at least partially drying the formed mixture and subjecting the dried formed mixture to a temperature of at least 1100° C. for a time sufficient for at least some of ther clay to convert into a binder to bind together the slate particles.

Utilising the method of the invention, a product of consistent quality may be made without requiring expensive binder raw material, but rather, relatively inexpensive clay may be used. Also it has been found that a greater proportion of slate may be used than in the prior method which results in an improved quality product, and it is possible to produce a thinner product with a mechanical strength equal to that of thicker products produced by the prior art method.

It will be appreciated that clay comprises typically about 48% silicates and that the firing process e.g. in a kiln will cause these silicates to be converted to a binder by fusing.

The slate particles may comprise fragments, powder and dust all of which are able to pass through a sieve of 6 mm preferably 3 mm size and more preferably 2 mm size and if desired slate particles at least some of which are too large to pass through such a size sieve may be subjected to a mechanical treatment to reduce the particles to slate particles all of which are able to pass through the sieve of 6 mm, preferably 3 mm and more preferably 2 mm size. For example the particles may be fed between string rollers which break larger fragments.

The slate particles may comprise a mixture of particles including mill fines, e.g. at least 40% mill fines by weight. At least 10% and more preferably at least 20% by weight of the slate particles may comprise slate dust/powder having a maximum dimension in the range 0.075 mm to 1 mm.

The homogenous mixture prior to forming is preferably generally dry but particularly where the slate particle include dust which presents a potential health hazard, the slate particles may include some water although the mixture will in general not be formable until wetted.

Conveniently to facilitate mixing a generally homogenous mixture, the clay to be mixed with the slate particles comprises powder which is all able to pass through a sieve of size 6 mm, preferably 3 mm and more preferably 1 mm size.

In one embodiment the solid constituents of the mixture may contain only slate particles and clay and the solid constituents of the mixture may comprise between 0.5% and 15% by weight, preferably between 6% and 15% by weight clay powder, and between 85% and 95% by weight slate particles. In one example the solid constituents of the mixture comprised 13% by weight, clay powder. To aid binding if desired some talc may be added to the mixture such that the solid constituents of the mixture comprise at least 1% by weight, talc.

The formable wet mixture may comprise between 0.5% and 19% by weight water, the amount of water used depending on the proportion of larger particles in the mix and the volume of the mix, so as to form a wet mixture which may conveniently be formed to the desired configuration and will retain its formed configuration well.

Preferably the wet mixture is formed to the desired configuration by moulding under pressure.

In one embodiment the wet mixture is moulded by forming the mixture to a generally ball shape, placing the ball shape in a mould and applying pressure to the ball shape such that the wet mixture fills the mould. In another embodiment the wet mixture is formed to the desired configuration by extruding the wet mixture through a die to form an, e.g. generally rectangular cross section, extruate, cutting the extruate to a desired length and placing the cut length of the extruate in a mould and subjecting the extruate to pressure such that the wet mixture fills the mould.

In each case, the formed wet mixture may be removed from the mould and moved towards e.g. a kiln and during such movement towards the kiln the wet mixture becomes at least partially dried. This movement towards the kiln may thus subject the wet formed mixture to a temperature gradient, the temperature increasing as the formed wet mixture moves toward the kiln.

This movement towards the kiln may be very slow but by the time the formed mixture enters the kiln, the water content may be reduced to below 10% by weight, for example to substantially 0% if desired.

If desired, the dried formed mixture may be subjected to a temperature in excess of 1000° C. e.g. at least 1145° C. for a time sufficient for at least some of the slate particles to be converted into a binder to bind together the remainder of the slate particles.

The product may be of any desired configuration for its intended use but the invention is particularly applicable where the product is of generally flat configuration.

Thus the product may be a building element such as a tile for roofing, flooring, and cladding for examples only.

According to a second aspect of the invention we provide a method of making a product comprising the steps of making a generally homogeneous mixture of slate particles, wetting the mixture as necessary to produce a formable composition, forming the mixture to desired configuration, at least partially drying the formed mixture and subjecting the dry formed mixture to a temperature of at least 1145° C. for a time sufficient for at least some of the slate particles to be converted into a binder to bind together the remainder of the slate particles.

In such a method, there is thus no need to use any binder in addition to the slate particles.

The mixture may included feldspar e.g. of at least 15% by weight, which fuses as the dried formed mixture is heated, into a binder.

According to a third aspect of the invention we provide a method of making a product comprising the steps of mixing together slate particles and feldspar particles, heating the mixture sufficiently for the feldspar to melt and fuse, permitting the material to cool, to bind the slate particles together.

The second and third aspects of the invention may utilise any of the features of the method of the first aspect of the invention.

Three examples of the invention will now be described.

In a first example, a roofing tile was made by subjecting slate particles to a sizing operation to reduce the size of any over large particles so that all the particles pass through a sieve of 3 mm size but optionally up to 6 mm, or down to 2 mm. The slate particles were a mixture of Fullersite and mill fines, and such particles being a readily available by-product from slate works for example.

The sizing operation was performed by feeding the slate particles between a pair of crushing rollers which were spaced apart approximately by a 3 mm space. However any other desired sizing operation may be performed provided that the slate particles to be used to make the roofing tile or other product are smaller than a maximum desired size.

Next clay was mixed with the slate particles. The clay and slate particles were substantially dry to facilitate mixing although the slate may contain some water to depress any tendency of the slate dust to be come airborne. The clay was in the form of clay powder obtained from crushing and/or otherwise subjecting the clay to mechanical operations to ensure that all of the clay powder/dust would pass through a sieve of size 1 mm although sieve size of up to 3 mm or even 6 mm may be used.

When a generally homogenous mixture was obtained, the mixture was wetted to produce a formable composition of mixture as a suspension in water. The water comprised about 8% by weight of the wetted mixture. Where a larger proportion of larger particles are used less water, e.g. down to 0.5% may be used, and where a larger proportion of smaller particles, e.g. dust, is used in the mixture, more water, e.g. up to 19% may be required to form a formable composition.

Also, the water content may be made up to 10% or more by weight, depending on the volume of the mix.

Because the slate particles at least, tend to be wet as provided, very little or even no water may need to be added to ensure that the wet mixture is of the desired consistency.

In this example, balls of the wet mixture were placed in moulds and the balls were subjected to pressure to cause the mixture to fill the moulds. As in this example a roofing tile was produced, the mould comprised a generally shallow tray and pressure was applied by means of a plate which was urged into the tray by a press.

The resultant tile-like formed wet mixture was then placed on a conveyor which slowly moved the mixture towards a kiln at a rate of about 4 minutes per foot (38.45 cm) advanced. As the mixture moved towards the kiln, the surrounding temperature increased and as a result the mixture was partially dried. By the time the mixture entered the kiln, which took about ½ hour, the moisture content was reduced to less than 7% by weight of the wetted formed mixture.

The kiln was an electric kiln having an internal temperature of about 1175° C. but at least 1100° C. although a gas kiln could have been used. The formed mixture was fired in the kiln for about half an hour, but could be fired for a longer period e.g. up to 4 hrs if desired.

The tile thus produced was mechanically very robust, generally impervious to water, and in appearance resembled a conventional clay roofing tile in texture and colour. It was found in experiments that a finer texture and even greater imperviousness to water could be achieved by firing the mixture at higher temperatures. Also, as explained in our previous patent GB 224051 referred to above, if it is desired to vary the colour of the tile, this may be achieved by changing the proportion of oxygen present in the kiln during firing.

In a second example, a wet slate particle/clay mixture was obtained as in the first example. However rather than placing balls of the wet mixture directly into a mould, the mixture was extruded through a die to produce an extruate of a generally constant, generally rectangular, cross section. The extruate was cut to desired lengths sufficient for a tile of a desired size to be produced therefrom. The individual cut lengths of extruate were then placed in moulds as in the previous example described and subjected to pressure, dried and fired in the manner previously described. An extruate of an alternative cross section may be made if desired.

In each case a tile was able to be produced which was not substantially thicker than a comparable conventional clay tile, and thinner than a comparable tile produced by the prior art method of our previous patent.

Various modifications are possible to these two examples without departing from the scope of the invention.

Particularly, slate fragments other than Fullersite/mill fines may be used as a raw material. The exact proportions of slate particles and clay powder may be varied within the ranges indicated above, and the moisture contents of the wet and partially dried mixtures may be varied within the ranges indicated above.

The time and temperature for firing the dried mixture may be varied provided that at least some of the natural silicates present in the clay are converted to binder. As a minimum, preferably the kiln temperature is about 1100° C. The speed at which the wetted mixture is moved towards the kiln may be increased as desired.

In the examples described, the roofing tiles produced were finished building products and no additional manufacturing steps to those described were required particularly after firing. However if desired, particularly where the product made by the method of the invention is an alternative product, additional manufacturing steps may be required on the product after firing.

In a third example, a generally homogeneous substantially dry mixture of slate particles was obtained from mixing Fullersite and mill fines, and crushing as necessary such that all of the slate particles were able to pass through a sieve of 3 mm size.

As in the first example, the mixture was wetted to produce a formable composition having about 8% by weight water or up to 10% or more depending on the mix volume. The mixture was formable in the manner of the second example described above e.g. extruding, cutting to length, and placing in a mould. The mixture in the mould was subjected to pressure, dried and fired in the manner described in relation to the first example. The kiln temperature was however higher than in the first and second examples i.e. 1200° C. but at least 1145° C.

The resultant tile was bound together by fused slate particles.

In each of the three examples described above, if desired some talc, e.g. up to 1% by weight of the solid constituents of the wet mixture, may be added to enhance binding together. Clay in a different form to powder, e.g. ball clay may be used in the mixture although this is more difficult to mix than is powder. Some feldspar may be included in any of the three above examples, which fuses as the mixture is heated further to bind the slate particles together when the mixture cools.

A fourth example of the invention will now be described.

A building product being a roofing tile was made by mixing together in a mixing machine, slate particles and feldspar particles, together accounting for over 90% of the weight of (solid constituents) the mixture.

The slate particles were a mixture of mill fines and slate powder being a waste product from the slate industry, the mill fines having a maximum dimension of 2 mm and the slate powder/dust having a maximum dimension in the range 0.075 mm to 1 mm. However other sizes of slate particles could be included in the slate particle mixture if so desired, depending on the nature of the end product. For a building product which is intended to be waterproof and devoid of voids, the slate particle mixture described has been found to be ideal.

The feldspar particles used were Forshammer Feldspar Grade FF/30 but other makes and grades could be used.

The constituents of the feldspar particles used was as follows—

Size
99%—maximum dimension less than 32 microns
92%—maximum dimension less than 20 microns
65%—maximum dimension less than 10 microns
Components
$SiO_2$ 75.6% by weight
$K_2O$ 4.2%
$Na_2O$ 4.8%

To promote adhesion and bonding of the binder and the slate particles, a small amount of talc was added, which accounted for only about 2% by weight of the (solid constituents of the) mixture. Preferably at least 1%, and less than 5% by weight if talc, is used. Also a small amount of ball clay was added to bind the mixture and to promote release of the mixture from the mould, and to add strength. This accounted for at least 3% preferably about 5.4% by weight of the mixture, but up to 7%.

To promote mixing in a mixing machine, some water was added to the otherwise generally dry mixture, of up to less than 8% by weight of the weight of the solid constituents of the mixture.

When thoroughly mixed, the mixture was placed in a mould and subjected to compression to remove voids therein, of greater that $1.5 \times 10^8 NM^2$ and more preferably of greater than $3.86 \times 10^8 NM^2$. The mixture was removed from the mould and without any pre-drying step being required, the mixture was heated to a temperature of at least 1000° C., and typically 1100–1200° C. for a heating time of at least 30 minutes to melt and fuse the feldspar.

Of course, during the initial stage of firing, the high temperatures will dry the mixture.

During firing, the feldspar and talc melt and some will react with the clay and the slate to form a glass bonded complex alumino-silicate structure.

Subsequently the product was permitted to cool.

In one experiment, the heating step was carried out in an atmosphere with reduced oxygen content, and this was found to affect the colour of the resultant product. The amount of oxygen present during heating can thus be controlled to produce a product of a desired colour characteristic.

Various modifications may be made to the fourth example described. For example the relative amounts of slate mill fines and powder dust may be widely varied and the amount of feldspar binder material used can be varied. Preferably though, the end product comprises at least 50% by weight of slate particles in the fused glassy binder. At least 40% of the weight of the final product, may be mill fines, and 20% by weight of the product may be slate powder/dust, although between 22% and 28% by weight may be slate particles.

Preferably, the product comprises at least 15% by weight, fused glassy feldspar, and preferably less than 25%.

It may be beneficial to add in addition to or instead of talc and ball clay, other incidentals such as colorants such as manganese, and other materials to assist release of the product from the mould such as Nepheline Sylenite.

The product may be finished when removed from the mould and/or after heating as required.

Although the invention is particularly useful for making building products and more especially tiles, the invention may be utilised for making other products.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A method of making a product which is generally impervious to water comprising the steps of making a generally homogenous mixture of slate particles and clay, wetting the mixture as necessary to produce a formable composition, forming the wet mixture to a desired configuration, at least partially drying the formed mixture and subjecting the dried formed mixture to a temperature of at least 1100° C. for a time sufficient for at least some of the clay to fuse into a binder to bind together the slate particles with the fused clay.

2. A method according to claim 1 wherein the slate particles comprise fragments, powder and dust all of which are able to pass through a sieve of 6 mm size.

3. A method according to claim 2 wherein the last particles are all able to pass through a sieve of 3 mm size.

4. A method according to claim 3 wherein the slate particles are all able to pass through a sieve of 2 mm size.

5. A method according to claim 2 wherein the method includes subjecting slate particles at least some of which are too large to pass through a sieve of 6 mm size to a mechanical treatment to reduce the particles to slate particles all of which are able to pass through the sieve of 6 mm size.

6. A method according to claim 1 wherein the slate particles comprise a mixture of particles including mill fines.

7. A method according to claim 6 wherein the slate particles comprise at least 40% mill fines.

8. A method according to claim 6 wherein at least 10% of the slate particles comprises slate dust/powder having a maximum dimension in the range 0.075 mm to 1 mm.

9. A method according to claim 8 wherein at least 20% of the slate particles comprises slate dust/powder having a maximum dimension in the range 0.075 mm to 1 mm.

10. A method according to claim 1 wherein the clay to be mixed with the slate particles comprises powder which is able to pass through a sieve of 6 mm size.

11. A method according to claim 10 wherein the powder is all able to pass through a sieve of 1 mm size.

12. A method according to claim 10 wherein the clay to be mixed with the slate particles comprises powder which is able to pass through a sieve of 3 mm size.

13. A method according to claim 10 wherein the clay to be mixed with the slate particles comprises powder which is able to pass through a sieve of 2 mm size.

14. A method according to claim 1 wherein the solid constituents of the mixture comprise between 0.5% and 15% by weight clay powder.

15. A method according to claim 14 wherein the solid constituents of the mixture comprises between 6 and 15% by weight, clay powder.

16. A method according to claim 15 wherein the solid constituents of the mixture comprises about 13.8% by weight clay powder.

17. A method according to claim 1 wherein the solid constituents of the mixture comprise at least 1% by weight talc.

18. A method according to claim 1 wherein the wet mixture comprises between 0.5% and 19% by weight water.

19. A method according to claim 1 wherein the wet mixture is formed to the desired configuration by molding under pressure.

20. A method according to claim 19 wherein the wet mixture is moulded by forming the mixture to a generally ball shape, placing the ball shape in a mould and applying pressure to the ball shape.

21. A method according to claim 1 wherein the wet mixture is formed to the desired configuration by extruding the wet mixture through a die to form an extruate, cutting the extruate to a desired length and placing the cut length of the extruate in a mold and subjecting the extruate to pressure such that the wet mixture fills the mold.

22. A method according to claim 21 wherein the extrudate has a generally rectangular cross section.

23. A method according to claim 1 wherein the wet formed mixture is moved towards a kiln and during such movement towards the kiln the wetted mixture becomes at least partially dried.

24. A method according to claim 23 wherein during at least partial drying the water content in the formed mixture is reduced to below 8% by weight.

25. A method according to claim 24 wherein the water content is reduced to substantially 0% by weight.

26. A method accordingly to claim 1 wherein the dried formed mixture is subjected to a temperature of at least 1145° C. for a time sufficient for at least some of the slate particles to be converted into a binder to bind together the remainder of the slate particles.

27. A method according to claim 1 wherein the product is of generally flat configuration.

28. A method according to claim 27 wherein the product is a building element.

29. A method according to claim 28 wherein the product is a tile.

30. A method according to claim 1 wherein the mixture includes feldspar which fuses as the dried formed mixture is heated.

31. A method according to claim 30 wherein the final product includes at least 15% by weight, fused glassy feldspar.

32. A method in accordance with claim 30 wherein the feldspar has a particle size distribution as follows:

99% of the feldspar particles have a maximum dimension less than 32 $\mu$m;

92% of the feldspar particles have a maximum dimension less than 20 $\mu$m; and

65% of the feldspar particles have a maximum dimension less than 10 $\mu$m.

33. A method according to claim 1, wherein the slate particles and clay are dry mixed prior to wetting the mixture.

34. A method of making a product comprising the steps of making generally homogeneous mixture of slate particles, wetting the mixture as necessary to produce a formable composition, forming the wet mixture to a desired configuration, at least partially drying the formed wet mixture and subjecting the dried formed mixture to a temperature of at least 1145° C. for a time sufficient for at least some of the slate particles to be converted into a binder to bind together the remainder of the slate particles.

35. A method of making a building product that is impervious to water comprising the steps of mixing together slate particles and feldspar particles, heating the mixture to a temperature of at least 1100° C. to melt and fuse the feldspar particles, and permitting the material to cool, to bind the slate particles together.

36. A method according to claim 35 wherein the mixture includes feldspar which fuses as the dried formed material is heated into a binder.

37. A method according to claim 36 wherein the final product includes at least 15% by weight, fused glassy feldspar.

38. A method of making a product containing at least 50% by weight slate which is generally impervious to water comprising steps of making a generally homogenous mixture of solids including slate particles and clay powder, wherein the clay comprises 0.5% to 15% by weight of the solids, wetting the mixture as necessary to produce a formable composition, forming the wet mixture to a desired configuration, at least partially drying the formed mixture and subjecting the dried form mixture to a temperature of at least 1100° C. for a time sufficient for at least some of the clay to fuse into a binder to bind together the slate particles with the fused clay.

39. A method of making a product containing at least 50% by weight slate which is generally impervious to water comprising the steps of making a generally homogenous mixture of slate particles and clay, wetting the mixture as necessary to produce a formable composition, fanning the wet mixture to a desired configuration, at least partially drying the formed mixture and subjecting the dried formed mixture to a temperature of at least 1100° C. for a time sufficient for at least some of the clay to fuse into a binder to bind together the slate particles with the fused clay, wherein the slate particles comprise a mixture of particle sizes including mill fines, and at least 10% of the slate particles have a maximum dimension in the range of 0.075 to 1 mm.

40. A method according to claim 39, wherein at least 20% of the slate particles have a maximum dimension in the range of 0.075 to 1.0 mm.

* * * * *